United States Patent
Ertel et al.

(10) Patent No.: US 9,818,207 B2
(45) Date of Patent: Nov. 14, 2017

(54) METHOD AND MEDICAL IMAGING SYSTEM FOR COMPENSATING FOR IMAGE ARTIFACTS IN MEDICAL IMAGING

(71) Applicant: SIEMENS AKTIENGESELLSCHAFT, Munich (DE)

(72) Inventors: Dirk Ertel, Neunkirchen am Brand (DE); Yiannis Kyriakou, Spardorf (DE)

(73) Assignee: Siemens Aktiengesellschaft, Munich (DE)

( * ) Notice: Subject to any disclaimer, the term of this patent is extended or adjusted under 35 U.S.C. 154(b) by 58 days.

(21) Appl. No.: 15/071,434

(22) Filed: Mar. 16, 2016

(65) Prior Publication Data

US 2016/0275704 A1   Sep. 22, 2016

(30) Foreign Application Priority Data

Mar. 16, 2015  (DE) .................. 10 2015 204 718

(51) Int. Cl.
*G06K 9/00* (2006.01)
*G06T 11/00* (2006.01)

(52) U.S. Cl.
CPC ......... *G06T 11/005* (2013.01); *G06T 2211/40* (2013.01)

(58) Field of Classification Search
CPC ....... A61B 6/032; A61B 6/4035; A61B 6/405; A61B 6/4241; A61B 6/482
USPC .......... 382/131; 250/363.04, 363.03, 370.08; 378/22; 600/436, 407
See application file for complete search history.

(56) References Cited

U.S. PATENT DOCUMENTS

| | | | |
|---|---|---|---|
| 7,558,439 B2 | 7/2009 | Weese et al. | |
| 7,675,038 B2 * | 3/2010 | Ray ................ | G01T 1/1611 |
| | | | 250/363.03 |
| 8,792,702 B2 | 7/2014 | Kyriakou | |
| 2007/0078339 A1 * | 4/2007 | Andress ............. | A61B 6/463 |
| | | | 600/436 |
| 2008/0187094 A1 * | 8/2008 | Stodilka ............ | A61B 6/032 |
| | | | 378/22 |

(Continued)

FOREIGN PATENT DOCUMENTS

| | | |
|---|---|---|
| DE | 102 31 061 A1 | 1/2004 |
| DE | 10 2011 075 904 A1 | 11/2012 |
| DE | 10 2011 075 917 A1 | 11/2012 |

*Primary Examiner* — Charlotte M Baker
(74) *Attorney, Agent, or Firm* — Laurence Greenberg; Werner Stemer; Ralph Locher

(57) ABSTRACT

A method compensates for image artifacts in a first imaging device for imaging a first subregion of a body. The image artifacts are caused by a second subregion of the body being disposed outside of a first field of view for the first device. First measured data for the first field of view is acquired by the first device. The first subregion lies in the first field of view. Second measured data are acquired for a second field of view in a second imaging device. Image data representing the subregions in the second device are calculated from the second measured data. A model representing the subregions is calibrated using the calculated image data. The data representing the second subregion in the first device are simulated using a calibrated model. A correction of the first measured data is performed using simulated data for reducing the image artifacts.

13 Claims, 1 Drawing Sheet

(56) References Cited

U.S. PATENT DOCUMENTS

2012/0294504 A1  11/2012  Kyriakou

* cited by examiner

METHOD AND MEDICAL IMAGING SYSTEM FOR COMPENSATING FOR IMAGE ARTIFACTS IN MEDICAL IMAGING

CROSS-REFERENCE TO RELATED APPLICATION

This application claims the priority, under 35 U.S.C. §119, of German patent application DE 10 2015 204 718.0, filed Mar. 16, 2015; the prior application is herewith incorporated by reference in its entirety.

BACKGROUND OF THE INVENTION

Field of the Invention

The invention relates to a method for compensating for image artifacts in a medical imaging device for imaging a first subregion of a body. The image artifacts are caused by a second subregion of the body that is to be imaged, which second subregion is disposed outside of a predetermined field of view for the medical imaging device. The invention also relates to a medical imaging system containing two medical imaging devices by which such a method can be carried out.

Generally, the different established medical imaging devices or modalities can perform imaging only in a limited field of view. Depending on the respective device and the size of a body or an object of which at least one subregion is to be imaged, a different subregion of the body is situated outside of the respective field of view associated with the device or modality. This can lead to artifacts in the imaging of the subregion of the body that is located in the field of view. In the field of magnetic resonance tomography, the artifacts are known as so-called "wrap-around artifacts" and can have a severely disruptive effect on the image quality and consequently on the usability of the medical images. However, characteristic artifacts also occur in the field of computed tomography; known as "truncation artifacts", these are generated when regions of a body or object that is to be examined lie outside of the corresponding field of view.

SUMMARY OF THE INVENTION

It is the object of the present invention to reduce image artifacts in a medical imaging device which are caused by a limited field of view and a body that is to be examined partially protruding out of the field of view.

This object is achieved by the respective subject matter of the two independent claims. Advantageous embodiment variants will become apparent from the dependent claims, the description and the figures.

The invention relates to a method for compensating for image artifacts in a first medical imaging device for imaging a first subregion of a body or object that is to be examined. In this case the image artifacts are caused by a second subregion of the body or object being disposed or present outside of a predetermined first field of view for the first medical imaging device. A first step in this case entails an acquisition of first measured data for the first field of view in the first device. The first subregion is in this case disposed in the first field of view. The second subregion lies outside of the first field of view. A further step is an acquisition of second measured data for a predetermined second field of view in a second medical imaging device. In this instance the first and the second subregion lie in the second field of view. Here, the respective devices can preferably image only regions of a body or an object that are located in the respective associated field of view. The field of view can then therefore be understood also as an imaging zone of the associated device in which objects can be imaged by the medical imaging device. Preferably, however, this is not possible outside of the imaging zone or the field of view under normal usage conditions.

A next step is a calculation of image data from the acquired second measured data. The image data in this case represents the first and the second subregion in the second device. Here, the device employed as the first and/or second medical imaging device can be a magnetic resonance device, an X-ray device, a computed tomography device, a single-photon emission computed tomography device and/or a positron emission tomography device.

In order to reduce the described image artifacts, in particular in order to improve a compensation of such image artifacts, a predefined model representing the first and the second subregion of the body is calibrated in a further step with the image data calculated from the second measured data. The calibration can in this case contain an adjustment of corresponding values for parameters of the model. In this way a deviation of the model from the body represented by the calculated image data, i.e. the first and/or second subregion of the body, can be minimized. The predefined model can be in particular a universal patient model which can be adapted by way of the calibration to match a respective individual patient. The predefined model can be stored in readiness in a database, for example.

Data representing the second subregion in the first device and/or the effect of the second subregion on measured data of the first device is now simulated with the aid of the calibrated model, which can be for example a universal patient model adapted to match a specific patient. The simulated data can be for example simulated measured data for the first device and/or data derived from measured data, such as image data, for example. The effect of the second subregion, which is located outside of the first field of view of the first device, on the acquired measured data for the first field of view or on data derived from the first measured data can accordingly be simulated. The simulation of the data therefore relates to regions of the model which correspond to the second subregion of the body and consequently are not covered by the first field of view. For the purposes of the simulation, a field of vision or virtual field of view (FOV) is therefore chosen which includes the regions of the model which contain the second subregion of the body that leads to the image artifacts.

Finally, the first measured data or data derived from the first measured data is corrected taking into account the simulated data, resulting in full or partial compensation of the cited image artifacts. Simulated measured data for the first field of view representing the second subregion or an effect of the second subregion can therefore be used for calculating image data representing, in particular exclusively, the first subregion in the first device from measured data for the first field of view.

This has the advantage that, in contrast to known methods, the respective imaging methods or imaging chains of the two medical imaging devices are no longer performed separately from one another, but rather information from the second imaging chain is integrated into the first imaging chain. A fully integrated solution is thus created in which the measured data of the second device is used in order to compensate for the cited image artifacts, for example the wrap-around artifacts or the truncation artifacts in the first medical imaging device. The use of a predefined model that is adapted as a result of the calibration to fit a prevailing situation is by nature noise-free, so distortions in the first imaging device due to noise, for example image noise, in the second imaging device are essentially excluded. Accordingly, the simulated data and a correction of the first measured data based on the simulated data are likewise noise-free. As a result of using measured data of the second device, image artifacts in the first device are reduced and consequently the final image quality in the first device is improved in a fundamental manner. Basic limitations of the first device are eliminated and its applicability in medical application areas is significantly extended.

In an advantageous embodiment variant it is provided that the first and the second medical imaging device are based on different technologies or principles of operation. In particular, the first device can be a magnetic resonance tomography system and the second device an X-ray-based C-arm system, or vice versa. The described method is advantageous precisely when the first device is a magnetic resonance tomography system, because magnetic resonance devices typically have a severely limited field of view, with the consequence that in many clinical situations a second subregion of a body that is to be examined, this second subregion being located outside of the field of view, distorts measurement results and leads to the cited wrap-around artifacts. The method is particularly advantageous even in the case of an X-ray-based C-arm system as the first device, since with this modality, too, it often happens in the day-to-day clinical routine that a subregion of a body that is to be examined is disposed outside of a field of view or imaging zone and consequently leads to the described truncation artifacts.

In a further embodiment variant it is provided that the calibration of the model with the calculated image data is performed iteratively, i.e. in particular repetitively in increments, and comprises in particular an iterative generation of a difference image between the calculated image data and simulated image data. In this case the simulated image data is simulated with aid of the model, taking into account a parameter setting for the acquisition of the second measured data. At the same time the difference image between the calculated image data and the simulated image data can be passed to a control algorithm which adapts the model in order to achieve a best possible correspondence between calculated and simulated image data, and consequently between model and body, for example patient model and actual patient. As is customary for such algorithms, an abort criterion can be predetermined in this case, for example a threshold at which a predetermined degree of correspondence is reached or a threshold at which a predetermined number of iteration passes is reached. The iterative calibration of the model has the advantage that the calibration of the model can be achieved particularly precisely and flexibly in accordance with predefined criteria.

In another embodiment variant it is provided that the model represents structural, in particular anatomical, characteristics and tissue-specific characteristics of the body which are relevant in particular to the principle of operation of the first and/or second imaging device. The tissue-specific characteristics can be an absorption behavior for X-ray radiation, for example, or a longitudinal and/or transverse relaxation time for a magnetic resonance tomography scan. This has the advantage that the model is particularly well suited for simulating image and/or measured data for the first and/or second imaging device.

In a particularly advantageous embodiment variant it is provided that the model contains different model elements representing in particular respective organs. In this case each model element can be characterized by a predefined series of information. The information can be stored in a vector, for example. This has the advantage that the model can be adapted particularly easily and flexibly, for example by way of an adjustment of individual values of the vector, to match a body that is present.

In this case it is provided in a preferred embodiment variant that for each of the model elements the model contains one or more of the following items of information: main extension directions of the model element on the basis of a respective orthogonal sub-coordinate system; extent of the model element in the main extension directions according to the respective associated orthogonal sub-coordinate system; position and orientation of the model element with respect to the body, the body in particular being described in a global coordinate system in which the respective sub-coordinate systems can be incorporated; tissue-specific absorption behavior of the model element for X-ray radiation, in particular for X-ray radiation of a predefined spectral distribution; tissue-specific behavior of the model element in a magnetic resonance tomography system, in particular a longitudinal and/or transverse relaxation time. This has the advantage that the model elements can be specified in a particularly compact manner, thereby enabling the model to be calibrated efficiently and effectively. The information can in this case be stored in a vector, for example. Accordingly, a simple adaption of the model can be performed for example in the case of an iterative calibration of the model by way of a change vector.

In another advantageous embodiment variant it is provided that the simulation of the data is carried out, taking into account a parameter setting for the acquisition of the first measured data. This has the advantage that the simulated data makes a particularly good fit with the acquired first measured data and a particularly good compensation of the image artifacts is possible. The parameter setting can be for example an echo time (TE) or a pulse repetition time (TR).

In a particularly advantageous embodiment variant it is provided that the simulation of the data contains the simulation of contributions of the second subregion to the first measured data or to the data derived from the first measured data without a simulation of contributions of the first subregion to the first measured data or to the data derived from the first measured data. The correction then additionally contains a subtraction of the simulated contributions from the first measured data or from the data derived from the first measured data. This can take place in the space domain or in the phase-frequency domain (k-space). As a result the simulated data, which corresponds to regions outside of the first field of view, can be used in order to correct the actual first measured data of the first field of view. For example, this can be effected by a simple subtraction according to the formula $$I_{MR}^{corr}(x,y) = I_{MR}(x,y) - I_{MR}^{sim}(x,y).$$

Here, $I_{MR}^{corr}(x,y)$ is the corrected contribution to an image, in the present case a magnetic resonance image, for a predefined location (x,y) in the first field of view, $I_{MR}(x,y)$ is an image contribution for said location derived from the acquired measured data, and $I_{MR}^{sim}(x,y)$ is an image contribution from the simulated data for the same location. In this case information from the region outside of the first field of view is convolved in the image contribution from the simulated data $I_{MR}^{sim}$. This is accomplished for example based on the specification of a measurement frequency $F_{MR}^{sim}$ of the magnetic resonance tomography scan during the simulation of the data according to $F_{MR}^{sim}=F_{Nyquist}-F_{MR}$, where $F_{Nyquist}$ is the Nyquist frequency and $F_{MR}$ the actual frequency of the magnetic resonance measurement. In this way the specific convolution of the second subregion lying outside of the first field of view or, as the case may be, the overlaying of the second subregions onto the measured image is taken into account. The formula cited by way of example also applies mutatis mutandis to devices other than magnetic resonance devices as the first imaging device. For clarity of illustration reasons, the space domain was also chosen in the present case for the formulation of the formula. The subtraction of the image artifact can also be applied directly in the phase-frequency domain, which affords advantages in terms of computation performance. This has the advantage that simulated data is combined with the first measured data in a computationally efficient manner in order to achieve the compensation of the artifacts.

In a further embodiment variant it is provided that the correction of the first measured data or the data derived from the first measured data contains an expansion of the first measured data or the data derived from the first measured data by the simulated data. This is advantageous specifically in the case of a computed tomography system as the first imaging device, since in this way the "truncated", i.e. artifact-laden, measured data of the computed tomography system is augmented by the simulated data or measured data. The measured data for the subregions lying outside of the first field of view can therefore be generated by a forward projection of the calibrated model. The usual technique of putting together an image from partial images obtained by different imaging methods can therefore be dispensed with. Instead, an image that equates to an image generated by a single imaging method can be assembled from the different sets of measured data. This has the advantage that a uniform impression is created and the image is particularly easy for an operator to interpret.

In a further particularly advantageous embodiment variant it is provided that the first measured data and the second measured data are in each case acquired by a single medical imaging apparatus which comprises the first and the second device. In this case the second field of view at least partially includes the first field of view, i.e. completely or at least in the region that is occupied by the first subregion of the body. In particular the apparatus can be an angio-magnetic resonance combination device. This has the advantage that the different sets of measured data have already been registered to one another, i.e. stand in a defined spatial relationship to one another, and that there is a minimal time lag between the acquisition of the first and the acquisition of the second set of measured data. As a result there is barely any change in the body between the two acquisition steps and a particularly precise compensation of the image artifacts is achieved. The precise co-registration of the two devices also enables the transfer of the data from one device to the other device or, as the case may be, the merging of the data to be completed particularly precisely. This results in the advantage of an improved compensation of the image artifacts.

The invention also encompasses a medical imaging system containing a first and a second medical imaging device. In this configuration the system can be implemented in particular as an apparatus contained in a single housing. In this arrangement the first medical imaging device has a predetermined first field of view and is configured for imaging a first subregion of a body that is located in the first field of view and for acquiring first measured data for that purpose. The second medical imaging device has a second predetermined field of view and is configured for imaging the first subregion that is located in the second field of view and a second subregion of the body that is disposed in the second field of view and is not located in the first field of view and for acquiring second measured data for that purpose. The second device is furthermore configured for calculating image data from the acquired second measured data, the image data representing the first and the second subregion in the second device.

The medical imaging system further contains a calibration unit for calibrating a predefined model representing the first and the second subregion with the calculated image data. A simulation unit for simulating data representing the second subregion in the first device with the aid of the calibrated model is also part of the medical imaging system. In this arrangement the first device is configured in addition for correcting the first measured data or data derived from the first measured data, taking into account the simulated data. Advantages and advantageous embodiment variants of the medical imaging system correspond in this case to the advantages and advantageous embodiment variants of the presented method for compensation of the image artifacts.

Other features which are considered as characteristic for the invention are set forth in the appended claims.

Although the invention is illustrated and described herein as embodied in compensation of image artifacts in medical imaging, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
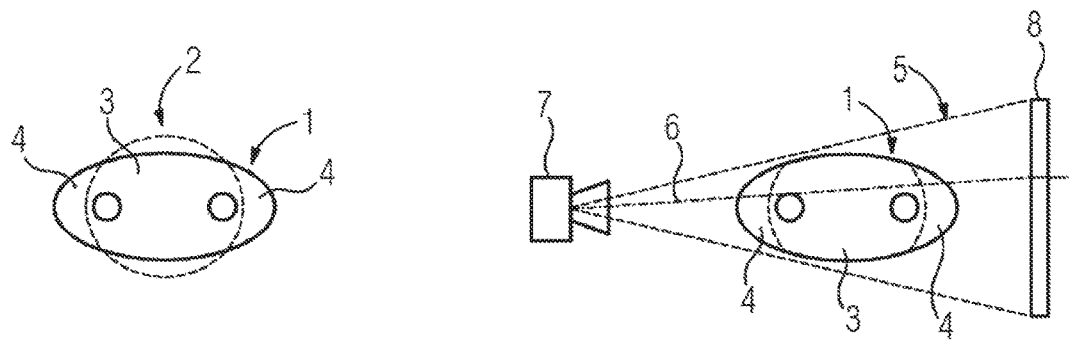
FIG. 1 is an illustration showing a juxtaposition of a first and a second field of view for an exemplary embodiment variant of the invention.

Referring now to the figures of the drawings in detail and first, particularly to FIG. 1 thereof, there is shown a juxtaposition of a first and a second field of view. Illustrated in the diagram on the left in this case is a body 1 that is to be examined, part of which is located in a first field of view 2. As depicted here, the body 1 has a first subregion 3, which is located in the first field of view 2, and two second subregions 4, which in the present example are located outside of the first field of view 2. The two second subregions 4 nonetheless have an effect on measurements in the first field of view 2 and as a result are responsible for undesirable image artifacts that are caused by the second subregion 4 being disposed outside of the first field of view 2. The image artifacts are typically referred to as "wrap-around artifacts" or "truncation artifacts". The first field of view 2 can have a circular shape, for example. This can be the case, for example, for a magnetic resonance tomography system as the associated first medical imaging device.

In the right-hand diagram of FIG. 1, the body 1 having the first and second subregions 3, 4 is now shown in a second field of view 5. The body 1 is arranged in this case with the first and second subregions 3, 4 completely in the second field of view 5. In the present example the second field of view 5 is conical in shape. This is due in the present instance to a second medical imaging device embodied as an X-ray-based C-arm system, which irradiates the body with an X-ray beam 6 from a radiation source 7 and in so doing images the body 1 with its first and second subregions 3, 4 on a detector 8. By an acquisition of second measured data of the body 1 having the first and second subregions 3, 4 in the second field of view 5 it is thus possible to obtain information about the second subregions 4 which consequently can then be used in the first imaging device for compensating for the image artifacts caused here by the second subregions 4.

Figure 2:
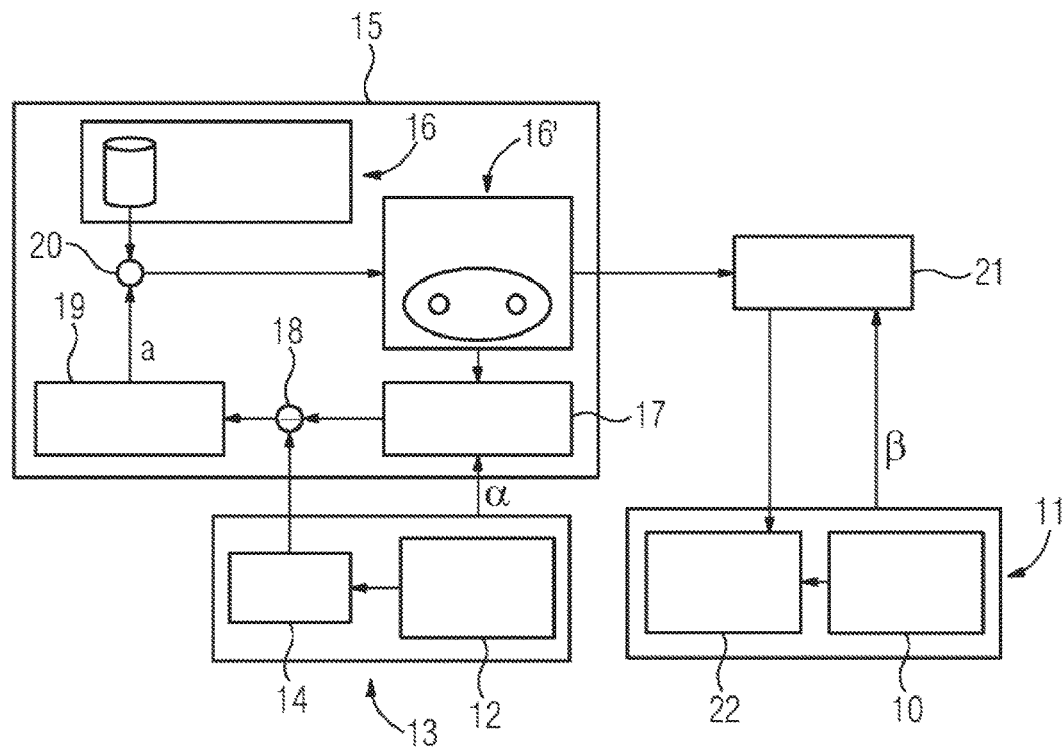
FIG. 2 is a block diagram showing a visualization of a method for compensating for artifacts according to a further exemplary embodiment variant of the invention.

FIG. 2 shows a visualization of a method for compensating for artifacts. In the present example, a first acquisition 10 of first measured data for the first field of view 2 (FIG. 1) is performed in the first instance in a first imaging medical device 11. The first imaging device 11 can be a magnetic resonance tomography system, for example. In addition, a second acquisition 12 of second measured data for the second field of view 5 (FIG. 1) is performed. This takes place in the present example in a second medical imaging device 13, which is embodied as a C-arm system, for example. A next step is a calculation 14 of image data representing the first and the second subregion 3, 4 (FIG. 1) in the second device 13 from the acquired second measured data. This is followed in turn by a calibration 15 of a predefined model 16.

The calibration 15 is implemented in the present case as an iterative calibration 15. The starting point is a universal predefined model 16, for example a patient model, which in the present example reflects anatomical characteristics and specific material properties in terms of the respective imaging modality of the second medical imaging device 13. In the example shown, the predefined model also contains different model elements, for example individual organs. In the example shown, a series of information is stored for each of the model elements in the predefined model 16, i.e. for example the basic shape of the corresponding organ, main preferred directions of the organ as orthogonal subsystem, a basic extent of the organ with respect to the main preferred directions, position and orientation of the organ in the patient—that is to say, a transformation matrix of the respective sub-coordinate system is stored in a global coordinate system—a tissue-specific absorption behavior with respect to X-ray radiation having different energy and/or the tissue-specific behavior in terms of a magnetic resonance imaging scan, in other words, for example, a longitudinal and/or transverse relaxation time. Thus, for a kidney, for example, the characteristic "bean shape" of the kidney can be stored in the predefined model together with orthogonal vectors $x_{kidney}$, $y_{kidney}$ and $z_{kidney}$ inter alia in the direction of the greatest and smallest extent of the kidney. The extent of the kidney in the directions, for example $|x_{kidney}|$ as the basic extent of the kidney in the $x_{kidney}$ direction, can also be stored. In addition, in the present example having a computed tomography system as second medical device 13, a tissue-specific absorption behavior $\mu_{kidney}$ for X-ray radiation can also be stored for the kidney.

Starting from this predefined model 16, in the example shown, a simulation 17 of image data for the second device 13, i.e. in the present example a simulation 17 of C-arm image data, is performed, taking into account a parameter setting a for the second acquisition 12. This is followed by a generation 18 of a difference image between the simulated and calculated image data for the first device 11. Then follows an evaluation 19 of the difference image by a control algorithm which modifies the predefined model 16 by way of a parameter vector a which determines the characteristics of the predefined model 16. In the next step of the iterative method, the original predefined model 16 with the default values is then no longer drawn upon for simulating the image data of the second device, but a calibrated model 16' is used instead. By making iterative passes through the steps of simulation 17, generation 18, evaluation 19 and adaptation 20 it is possible to continue the calibration 15 until the calibrated model 16' fulfills predefined criteria. It is important at this juncture that the vector a applies values only in the orthogonal sub-coordinate systems of the respective organs, for example of the kidney, but makes no changes to the orthogonal sub-coordinate system itself.

If the calibrated model 16' satisfies the predefined conditions, a simulation 21 of data representing the second subregion 4 (FIG. 1) takes place in the first device 11 with the aid of said calibrated model 16'. A field of view (FOV) for the simulation 21 is therefore chosen which in fact contains precisely the regions that lead to the wrap-around artifacts. In the present model, a parameter setting β for the first acquisition 10 of the first measured data is taken into account for this purpose. In the present example, image data for a magnetic resonance tomography scan is simulated in this way. Finally, a correction 22 of the first measured data or of data derived from the first measured data is carried out, taking into account the simulated data. Thus, for example, wrap-around artifacts of a magnetic resonance tomography scan can be subtracted from the latter such that image data calculated from the first measured data represents the first subregion 3 (FIG. 1) after the correction 22, in this case subtraction, without the wrap-around artifacts.

The invention claimed is:

1. A method for compensating for image artifacts in a first medical imaging device for imaging a first subregion of a body, wherein the image artifacts are caused by a second subregion of the body being disposed outside of a first field of view for the first medical imaging device, the method comprises the steps of:
   acquiring first measured data for the first field of view in the first medical imaging device, the first subregion lying in the first field of view;
   acquiring second measured data for a second field of view in a second medical imaging device, the first and the second subregions lying in the second field of view;
   calculating image data representing the first and the second subregions in the second medical imaging device from the second measured data acquired;
   calibrating a predefined model representing the first and the second subregions with the image data calculated;
   simulating data representing the second subregion in the first medical imaging device with aid of calibrated model; and
   correcting the first measured data or of data derived from the first measured data, taking into account simulated image data.

2. The method according to claim 1, which further comprises basing the first and the second medical imaging devices on different technologies or principles of operation.

3. The method according to claim 1, which further comprises performing the calibrating of the predefined model with the image data iteratively and contains an iterative generation of a difference image between the image data and the simulated image data, the simulated image data being simulated with an aid of the predefined model, taking into account a parameter setting for an acquisition of the second measured data.

4. The method according to claim 1, wherein the predefined model represents structural characteristics and tissue-specific characteristics of the body which are relevant in to a principle of operation of the first and/or second medical imaging devices.

5. The method according to claim 1, wherein the predefined model contains different model elements representing respective organs.

6. The method according to claim 5, wherein for each of the model elements the predefined model contains at least one of the following items of information: a shape of a model element; main extension directions of the model element on a basis of a respective orthogonal sub-coordinate system; extent of the model element in the main extension directions; position and orientation of the model element with respect to the body; tissue-specific absorption behavior of the model element for X-ray radiation including X-ray radiation of a predefined spectral distribution; tissue-specific behavior of the model element in a magnetic resonance tomography system, including a longitudinal and/or transverse relaxation time.

7. The method according to claim 1, which further comprises performing a simulation of the data, taking into account a parameter setting for an acquisition of the first measured data.

8. The method according to claim 1, wherein:
the simulation of the data includes the simulation of contributions of the second subregion to the first measured data or to the data derived from the first measured data without a simulation of contributions of the first subregion to the first measured data or to the data derived from the first measured data; and
the correcting step includes a subtraction of simulated contributions from the first measured data or from data derived from the first measured data in a space domain or in a phase-frequency domain.

9. The method according to claim 1, wherein the step of correcting the first measured data or the data derived from the first measured data includes an expansion of the first measured data or the data derived from the first measured data by the simulated image data.

10. The method according to claim 1, which further comprises carrying out the acquiring steps for acquiring the first measured data and acquiring the second measured data by a single medical imaging apparatus which contains the first and the second medical imaging devices, namely an angio-magnetic resonance combination device, and the second field of view at least partially includes the first field of view.

11. The method according to claim 1, wherein:
the first medical imaging device is a magnetic resonance tomography system and the second medical imaging device is an X-ray-based C-arm system; or
the first medical imaging device is a computed tomography system and the second medical imaging device is an X-ray-based C-arm system.

12. The method according to claim 1, wherein the predefined model represents anatomical characteristics and tissue-specific characteristics of the body which are relevant in to a principle of operation of the first and/or second medical imaging device.

13. A medical imaging system, comprising:
a first medical imaging device having a first field of view, said first medical imaging device configured to image a first subregion of a body that is disposed in the first field of view, to which end first measured data is acquired;
a second medical imaging device having a second field of view, said second medical imaging device configured to image the first subregion disposed in the second field of view and a second subregion of the body disposed in the second field of view and not disposed in the first field of view, to which end second measured data is acquired, said second medical imaging device configured to perform a calculation of image data from the second measured data acquired, the image data representing the first and second subregions in said second medical imaging device;
a calibration unit for calibrating a predefined model representing the first and the second subregions with the image data calculated;
a simulation unit for simulating data representing the second subregion in said first medical imaging device with a aid of a calibrated model; and
said first medical imaging device configured for a correction of the first measured data or of data derived from the first measured data, taking into account simulated data.

* * * * *